(12) United States Patent
Christinzio et al.

(10) Patent No.: US 11,885,206 B2
(45) Date of Patent: Jan. 30, 2024

(54) ELECTRIC MOTOR DRIVEN TRANSPORTATION MECHANISMS FOR FRACTURING BLENDERS

(71) Applicant: U.S. Well Services, LLC, Houston, TX (US)

(72) Inventors: Alexander Christinzio, Houston, TX (US); Brandon Hinderliter, Houston, TX (US); Lon Robinson, Houston, TX (US); Jared Oehring, Houston, TX (US)

(73) Assignee: U.S. Well Services, LLC, Houston, TX (US)

( * ) Notice: Subject to any disclaimer, the term of this patent is extended or adjusted under 35 U.S.C. 154(b) by 0 days.

(21) Appl. No.: 17/135,543

(22) Filed: Dec. 28, 2020

(65) Prior Publication Data

US 2021/0198994 A1 Jul. 1, 2021

Related U.S. Application Data

(60) Provisional application No. 62/955,295, filed on Dec. 30, 2019.

(51) Int. Cl.
*E21B 43/26* (2006.01)
*B01F 33/80* (2022.01)
(Continued)

(52) U.S. Cl.
CPC ........ *E21B 43/2607* (2020.05); *B01F 27/232* (2022.01); *B01F 33/805* (2022.01); *B01F 35/71775* (2022.01)

(58) Field of Classification Search
CPC .. E04G 21/04; B28C 7/00; B28C 7/02; B28C 5/0875; B28C 9/04; B28C 7/0454;
(Continued)

(56) References Cited

U.S. PATENT DOCUMENTS 2,976,025 A 3/1961 Pro
3,878,884 A 4/1975 Raleigh
(Continued)

FOREIGN PATENT DOCUMENTS

CN 104117308 A 10/2014
CN 104196613 A 12/2014
(Continued)

OTHER PUBLICATIONS

Kroposki et al., Making Microgrids Work, 6 IEEE Power and Energy Mag. 40, 41 (2008).
(Continued)

*Primary Examiner* — Charles Cooley
(74) *Attorney, Agent, or Firm* — Hogan Lovells US LLP (57) ABSTRACT

A system for electric-motor driven transportation mechanism for fracturing operations is disclosed. The system includes at least one transportation mechanism to transport blender components for a blender fluid from a first tub that may be a proppant hopper to a second tub that may be a blender tub and that may be associated with a fracturing blender; an electric motor and a control unit associated with the at least one transportation mechanism; and at least one variable frequency drive (VFD) associated with the electric motors for real time control of a speed associated with the at least one transportation mechanism.

20 Claims, 8 Drawing Sheets

(51) Int. Cl.
    *B01F 35/71* (2022.01)
    *B01F 27/232* (2022.01)
(58) Field of Classification Search
    CPC ..... B28C 7/044; B28C 9/0454; B28C 7/0418;
            B28C 7/0422; B28C 7/0477; B28C 7/10;
            B28C 9/0481; B28C 9/049; B01F
            15/0235; B01F 15/00538; B01F
            15/00519; B01F 2215/0081; B01F
            35/71731; B01F 35/32025; B01F
            35/3204; B01F 2101/49; B01F 33/805;
            B01F 35/71775; B01F 33/823; F01D
            15/08; F01D 15/10; F02C 3/22; F04B
            49/20; F04B 19/22; F04B 17/03; F04B
            17/06; F04B 23/00; F04B 47/02; F04B
            49/065; H02P 23/00; E21B 43/267; E21B
            43/26; E21B 43/2607; B65G 33/18;
            B65G 47/19; Y02P 70/10
    USPC .... 366/14–20, 27–29, 33–35, 64–66, 37–38,
            366/31–32, 50–51, 41, 155.1–158.4
    See application file for complete search history.

(56) References Cited

U.S. PATENT DOCUMENTS

| | | | |
|---|---|---|---|
| 4,411,313 | A | 10/1983 | Johnson et al. |
| 4,538,916 | A | 9/1985 | Zimmerman |
| 4,601,629 | A | 7/1986 | Zimmerman |
| 4,768,884 | A | 9/1988 | Elkin |
| 5,114,239 | A | 5/1992 | Allen |
| 5,334,899 | A | 8/1994 | Skybyk |
| 5,439,066 | A | 8/1995 | Gipson |
| 5,486,047 | A | 1/1996 | Zimmerman |
| 5,798,596 | A | 8/1998 | Lordo |
| 5,813,455 | A | 9/1998 | Pratt et al. |
| 5,950,726 | A | 9/1999 | Roberts |
| 6,035,265 | A | 3/2000 | Dister et al. |
| 6,097,310 | A | 8/2000 | Harrell et al. |
| 6,121,705 | A | 9/2000 | Hoong |
| 6,273,193 | B1 | 8/2001 | Hermann et al. |
| 6,442,942 | B1 | 9/2002 | Kopko |
| 6,585,455 | B1 | 7/2003 | Petersen et al. |
| 6,788,022 | B2 | 9/2004 | Sopko |
| 6,985,750 | B1 | 1/2006 | Vicknair et al. |
| 7,795,830 | B2 | 9/2010 | Johnson |
| 9,062,545 | B2 | 6/2015 | Roberts et al. |
| 9,140,105 | B2 | 9/2015 | Pattillo |
| 9,353,593 | B1 | 5/2016 | Lu et al. |
| 9,506,333 | B2 | 11/2016 | Castillo et al. |
| 9,790,858 | B2 | 10/2017 | Kanebako |
| 9,945,365 | B2 | 4/2018 | Hernandez et al. |
| 10,221,639 | B2 | 3/2019 | Romer et al. |
| 10,408,030 | B2 | 9/2019 | Oehring et al. |
| 10,408,031 | B2 | 9/2019 | Oehring et al. |
| 10,415,332 | B2 | 9/2019 | Morris et al. |
| 10,648,270 | B2 | 5/2020 | Brunty et al. |
| 10,648,311 | B2 | 5/2020 | Oehring et al. |
| 10,686,301 | B2 | 6/2020 | Oehring et al. |
| 10,731,561 | B2 | 8/2020 | Oehring et al. |
| 10,740,730 | B2 | 8/2020 | Altamirano et al. |
| 10,767,561 | B2 | 9/2020 | Brady |
| 10,781,752 | B2 | 9/2020 | Kikkawa et al. |
| 10,794,165 | B2 | 10/2020 | Fischer et al. |
| 10,837,270 | B2 * | 11/2020 | Coli ............ E21B 43/26 |
| 10,864,487 | B1 * | 12/2020 | Han ............ B01F 35/3204 |
| 10,988,998 | B2 | 4/2021 | Fischer et al. |
| 11,203,879 | B2 * | 12/2021 | DeGaray ............ B28C 7/0418 |
| 2001/0000996 | A1 | 5/2001 | Grimland et al. |
| 2004/0045703 | A1 | 3/2004 | Hooper et al. |
| 2005/0201197 | A1 | 9/2005 | Duell et al. |
| 2006/0109141 | A1 | 5/2006 | Huang |
| 2007/0226089 | A1 * | 9/2007 | DeGaray ............ G06Q 10/087 705/28 |
| 2008/0094939 | A1 * | 4/2008 | Wenger ............ B01F 35/2209 366/601 |
| 2008/0164023 | A1 | 7/2008 | Dykstra et al. |
| 2008/0257449 | A1 | 10/2008 | Weinstein et al. |
| 2008/0277120 | A1 | 11/2008 | Hickie |
| 2009/0072645 | A1 | 3/2009 | Quere |
| 2011/0081268 | A1 | 4/2011 | Ochoa et al. |
| 2011/0110793 | A1 | 5/2011 | Leugemors et al. |
| 2012/0063936 | A1 | 3/2012 | Baxter et al. |
| 2012/0112757 | A1 | 5/2012 | Vrankovic et al. |
| 2012/0150455 | A1 | 6/2012 | Franklin et al. |
| 2012/0205400 | A1 * | 8/2012 | DeGaray ............ B28C 7/064 222/192 |
| 2013/0051971 | A1 | 2/2013 | Wyse et al. |
| 2013/0199617 | A1 * | 8/2013 | DeGaray ............ B28C 9/0454 137/1 |
| 2013/0284455 | A1 | 10/2013 | Kajaria et al. |
| 2014/0174717 | A1 | 6/2014 | Broussard et al. |
| 2015/0147194 | A1 | 5/2015 | Foote |
| 2015/0233530 | A1 | 8/2015 | Sandidge |
| 2016/0006311 | A1 | 1/2016 | Li |
| 2016/0230660 | A1 | 8/2016 | Zeitoun et al. |
| 2016/0326853 | A1 | 11/2016 | Fred et al. |
| 2017/0028368 | A1 * | 2/2017 | Oehring ............ E21B 43/26 |
| 2017/0082033 | A1 | 3/2017 | Wu et al. |
| 2017/0096889 | A1 | 4/2017 | Blanckaert et al. |
| 2017/0144831 | A1 * | 5/2017 | Hodgson ............ B01F 23/59 |
| 2017/0204852 | A1 | 7/2017 | Barnett |
| 2017/0212535 | A1 | 7/2017 | Shelman et al. |
| 2017/0259227 | A1 * | 9/2017 | Morris ............ B01F 23/551 |
| 2017/0369258 | A1 * | 12/2017 | DeGaray ............ B28C 7/0418 |
| 2017/0370639 | A1 | 12/2017 | Barden et al. |
| 2018/0090914 | A1 | 3/2018 | Johnson et al. |
| 2018/0181830 | A1 | 6/2018 | Luharuka et al. |
| 2018/0259080 | A1 | 9/2018 | Dale et al. |
| 2018/0266217 | A1 | 9/2018 | Funkhauser et al. |
| 2018/0284817 | A1 | 10/2018 | Cook et al. |
| 2018/0298731 | A1 | 10/2018 | Bishop |
| 2018/0312738 | A1 | 11/2018 | Rutsch et al. |
| 2018/0313677 | A1 | 11/2018 | Warren et al. |
| 2018/0347214 | A1 * | 12/2018 | DeGaray ............ B28C 7/044 |
| 2018/0363640 | A1 | 12/2018 | Kajita et al. |
| 2018/0366950 | A1 | 12/2018 | Pedersen et al. |
| 2019/0010793 | A1 * | 1/2019 | Hinderliter ............ E21B 43/26 |
| 2019/0040727 | A1 | 2/2019 | Oehring et al. |
| 2019/0128104 | A1 | 5/2019 | Graham et al. |
| 2019/0145251 | A1 | 5/2019 | Johnson |
| 2019/0154020 | A1 | 5/2019 | Glass |
| 2019/0249527 | A1 | 8/2019 | Kraynek |
| 2019/0257462 | A1 | 8/2019 | Rogers |
| 2020/0040878 | A1 | 2/2020 | Morris |
| 2020/0325760 | A1 | 10/2020 | Markham |
| 2020/0350790 | A1 | 11/2020 | Luft et al. |
| 2021/0198994 | A1 * | 7/2021 | Christinzio ............ B01F 33/805 |
| 2022/0297346 | A1 * | 9/2022 | Johnson ............ B28C 5/0818 |

FOREIGN PATENT DOCUMENTS

| | | |
|---|---|---|
| CN | 112196508 A | 1/2021 |
| WO | 2009046280 | 4/2009 |
| WO | 2014177346 | 11/2014 |
| WO | 2018044307 A1 | 3/2018 |
| WO | 2018213925 A1 | 11/2018 |
| WO | 2019210417 | 11/2019 |

OTHER PUBLICATIONS

Dan T. Ton & Merrill A. Smith, The U.S. Department of Energy's Microgrid Initiative, 25 The Electricity J. 84 (2012), pp. 84-94.
Non-Final Office Action issued in U.S. Appl. No. 16/871,328 dated Dec. 9, 2021.
Non-Final Office Action issued in U.S. Appl. No. 16/943,935 dated Oct. 21, 2021.
Non-Final Office Action issued in U.S. Appl. No. 16/564,186, dated Oct. 15, 2021.
Final Office Action issued in U.S. Appl. No. 16/356,263 dated Oct. 7, 2021.

(56) References Cited

OTHER PUBLICATIONS

Non-Final Office Action issued in U.S. Appl. No. 17/060,647 dated Sep. 20, 2021.
Non-Final Office Action issued in U.S. Appl. No. 16/901,774 dated Sep. 14, 2021.
Canadian Office Action issued in Canadian Application No. 3,094,768 dated Oct. 28, 2021.
Non-Final Office Action issued in U.S. Appl. No. 16/871,928 dated Aug. 25, 2021.
Non-Final Office Action issued in U.S. Appl. No. 16/943,727 dated Aug. 3, 2021.
Non-Final Office Action issued in U.S. Appl. No. 14/881,525 dated Jul. 21, 2021.
Non-Final Office Action issued in U.S. Appl. No. 16/404,283 dated Jul. 21, 2021.
Notice of Allowance and Notice of Allowability issued in U.S. Appl. No. 15/829,419 dated Jul. 26, 2021.
Woodbury et al., "Electrical Design Considerations for Drilling Rigs," IEEE Transactions on Industry Applications, vol. 1A-12, No. 4, Jul./Aug. 1976, pp. 421-431.
Morris et al., U.S. Appl. No. 62/526,869, Hydration-Blender Transport and Electric Power Distribution for Fracturing Operation; Jun. 28, 2018; USPTO; see entire document.
Final Office Action dated Feb. 4, 2021 in U.S. Appl. No. 16/597,014.
International Search Report and Written Opinion dated Feb. 4, 2021 in PCT/US20/59834.
International Search Report and Written Opinion dated Feb. 2, 2021 in PCT/US20/58906.
International Search Report and Written Opinion dated Feb. 3, 2021 in PCT/US20/58899.
Non-Final Office Action dated Jan. 29, 2021 in U.S. Appl. No. 16/564,185.
Final Office Action dated Jan. 21, 2021 in U.S. Appl. No. 16/458,696.
Final Office Action dated Jan. 11, 2021 in U.S. Appl. No. 16/404,283.
Non-Final Office Action dated Jan. 4, 2021 in U.S. Appl. No. 16/522,043.
International Search Report and Written Opinion dated Dec. 14, 2020 in PCT/US2020/53980.
International Search Report and Written Opinion mailed in PCT/US20/67526 dated May 6, 2021.
International Search Report and Written Opinion mailed in PCT/US20/67608 dated Mar. 30, 2021.
International Search Report and Written Opinion mailed in PCT/US20/67528 dated Mar. 19, 2021.
International Search Report and Written Opinion mailed in PCT/US20/67146 dated Mar. 29, 2021.
International Search Report and Written Opinion mailed in PCT/US20/67523 dated Mar. 22, 2021.
International Search Report and Written Opinion mailed in PCT/US2020/066543 dated May 11, 2021.

\* cited by examiner

ELECTRIC MOTOR DRIVEN TRANSPORTATION MECHANISMS FOR FRACTURING BLENDERS

CROSS-REFERENCE TO RELATED APPLICATION

The present application is related to and claims benefit of priority to U.S. Provisional Application No. 62/955,295, titled ELECTRIC MOTOR DRIVEN AUGERS FOR FRACTURING BLENDERS, filed on Dec. 30, 2019, the entire disclosure of which is incorporated by reference herein for all intents and purposes.

BACKGROUND

Field of Invention

In at least one embodiment, the present disclosure relates to hydraulic fracturing. In at least one embodiment, a system having electric motor driven augers for fracturing blenders in hydraulic fracturing operation is disclosed.

Related Technology

Fracturing, such as hydraulic fracturing, stimulates production from hydrocarbon producing wells. Such a process may utilize mobile systems for injection fluid into wellbores at pressures that are determined to provide subterranean fissures in areas around wellbores. A fracturing process may also rely on a fracturing fluid slurry that has been pressurized using high pressure pumps. As a fracturing process may include mobility requirements, high pressure pumps are required to be mounted on mobile surfaces of a fracturing fleet—such as, on skids, on truck-beds, and on trailers. Moreover, high pressure pumps may be powered by mobile power sources, such as by diesel engines. However, fracturing equipment components, such as the high-pressure pumps and associated power sources are required to have large volumes and masses to support hydraulic fracturing pumps that draw low pressure fluid slurry at approximately 100 pounds per square inch (psi). The discharge of the same fluid slurry may be required to be at high pressures of up to 15,000 psi or more. A single tub associated with fluid slurry may be mounted on a trailer, skid, or body load.

A fracturing fluid blender may be provided in a fracturing fleet for blending components of a hydraulic fracturing fluid. Blended components are supplied to the high-pressure pumps. Blending components that are fluid or liquid, such as chemicals, water, and acid may be supplied via fluid lines from respective sources. Blending components that are solid, such as mud or sand are supplied via a conveyor belt or augers. While a fracturing fluid blender (or fracturing blender) may be provided in a mobile unit, blending operations itself occurs in a blending tub of a fracturing fluid blender. Augers or a conveyer belt may be hydraulic-based systems having one or more of hydraulic fluid, pumps, motors, filters, and plumbing that may be subject to operational failures.

SUMMARY

In at least one embodiment, an improvement to address the above-described issues is described. In at least one embodiment, a system for an electric-motor driven transportation mechanism in a fracturing blender is disclosed. In at least one embodiment, a system for a fracturing blender includes a transportation mechanism to transport blender components for a blender fluid from a first tub that may be a proppant hopper to a second tub that may be a blender tub of a fracturing blender. In at least one embodiment, an electric motor and a control unit are associated with an electric-motor transportation mechanism. In at least one embodiment, one or more variable frequency drives (VFDs) may be integrated within electric motors to provide for real-time control of a speed associated with an electric-motor transportation mechanism.

In at least one embodiment, a system for blending in fracturing operations includes at least one transportation mechanism to transport blending components from a first tub to a second tub. In at least one embodiment, a second tub enables blending operations as part of a fracturing blender. In at least one embodiment, an electric motor and a control unit are associated with at least one transportation mechanism. In at least one embodiment, at least one variable frequency drive (VFD) is associated with an electric motor and a control unit so that the at least one VFD enables real-time control of a speed associated with the at least one transportation mechanism.

In at least one embodiment, a method for blending in fracturing operations includes associating at least one transportation mechanism with a first tub and a second tub. In at least one embodiment, at least one transportation mechanism is adapted to transport blending components from a first tub to a second tub for enabling blending operations. In at least one embodiment, a method includes enabling an electric motor and a control unit to cause movement associated with at least one transportation mechanism. At least one variable frequency drive (VFD) is associated with an electric motor and a control unit, and the at least one VFD is enabled to provide real-time control of a speed associated with movement caused in at least one transportation mechanism associated with the electric motor.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The present system and method address the above complexities and deficiencies in a fracturing fluid blender (also referred to as fracturing blender) that is fed by hydraulic-based transportation mechanisms.

In hydraulic fracturing, proppant (such as sand or other synthetic media) may be pumped into a well bore, as a main component, to help allow hydrocarbons to flow to an external surface during production of a well. In at least one embodiment, proppant may be mixed in a blender or other system and may be delivered as a slurry to fracturing pumps for pumping into a well bore. In at least one embodiment, proppant may be transported to a proppant hopper using a transportation process such as by a truck or conveyer delivery system. In at least one embodiment, a present electric motor and associated VFD configuration may be used with a conveyer delivery system to bring proppant to a proppant hopper. Once in the proppant hopper, proppant may be moved to a blender tub at a predetermined concentration or predetermined rate, in accordance with at least one embodiment. Delivery of the proppant from a proppant hopper to a blender tub may be performed using a transportation mechanism, including augers, screws, or conveyers. A person of ordinary skill reading the present disclosure will be able to apply the present aspects to other transportation mechanisms than non-limiting examples provided herein.

In at least one embodiment, a transportation mechanisms, when driven by hydraulic motors may be susceptible to failure due to many hydraulic components required to support such a system. In addition, in an event of a failure, hydraulic fluid may also negatively impact an environment of a fracking operation, such as by a spill of the hydraulic fluid that may seep into the ground surrounding a fracturing operation.

Aspects of the present disclosure can provide specific control to a transportation mechanism for a fracturing fluid blender by using one or more electric motors with at least one VFD to turn an appropriate mechanical component of the transportation mechanism. In at least one embodiment, when auger(s) are used to deliver proppant from a proppant hopper to a blender tub, one or more electric motors may be controlled by an associated VFD to advance a transportation mechanism in a limited manner between a proppant hopper and a blender tub. In at least one embodiment, movement of a transportation mechanism consequently delivers proppant in predetermined or controlled amounts or concentrations.

In at least one embodiment, electric motors are adapted with an associated VFD feature to control their speeds precisely. In at least one embodiment, a number of augers and a size of the augers for such a process may be predetermined to an intended application or proppant used. An auger or a screw transportation mechanism may be used with an electric motor, in accordance with at least an embodiment, but a conveyer having appropriately sized buckets, paddles, or scoops may be used, In at least one embodiment, a conveyer may be used in an alternative embodiment for carrying proppant into a blender tub from a hopper. In addition, a proppant hopper may be designed to more efficiently support an electric motor transportation mechanism for delivery of proppant. FIGS. 2-4E cover aspects of such proppant hopper design, as well as a placement of electric motor(s) and at least one blender tub to support precise delivery of proppant to the blender tub.

Figure 1:
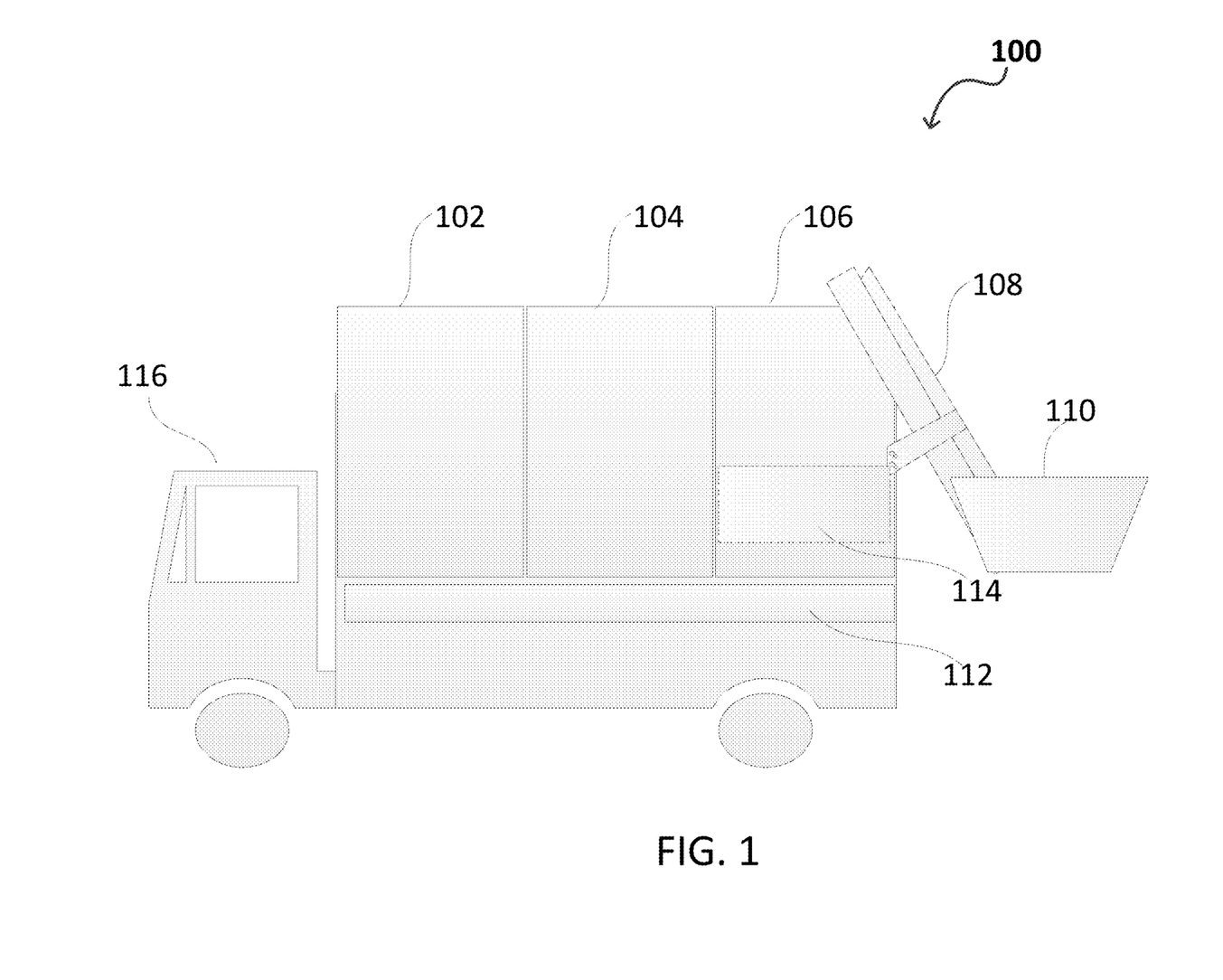
FIG. 1 illustrates an example system of a fracturing fluid blender subject to improvements of the present disclosure, in accordance with at least one embodiment herein.

FIG. 1 illustrates an example system 100 of a fracturing fluid blender subject to improvements of the present disclosure, in accordance with at least one embodiment. System 100 may be a fracturing fluid blender on a mobile unit 116, and the mobile unit 116 is part of a fracturing fleet. A fracturing fluid blender may include a mechanical unit 102, a control unit 104, and a blending unit 106. The blending unit 106 may be supported by augers, conveyors, or other transportation mechanisms 108 and by a blender tub 114 as well as proppant hopper 110. An additional control unit 112 (referred to as a fluid and solid control unit) may include valves and tank components to buffer or provide the solid or fluid components for blending in the blender tub 114.

In at least one embodiment, a mechanical unit 102 may include high- and low-pressure pumps. In at least one embodiment, one or more of the pumps, valves, and tank components may be external to the fracturing fluid blender. In at least one embodiment, sand may be transferred from an external holding area or tank to the blender tub 114 directly or through the augers or the other transporting mechanisms 108. In an example, the proppant hopper 110 may be used as a tank or may be used as an intermediate storage from the external holding area. Another type of transportation mechanism 108 includes drop-tanks. Further, while FIG. 1 illustrates sections 102-106 as rectangular modules, a person of ordinary skill reading the present disclosure will readily understand that specific components for a mechanical unit, such as pumps, motors, drive trains, etc.; for the control unit, such as sensors, screens, man-machine interfaces, etc.; and for the blending unit, such as valves, directors, protectors, etc., may be used in application with a fracturing fluid blender presently disclosed.

Figure 2:
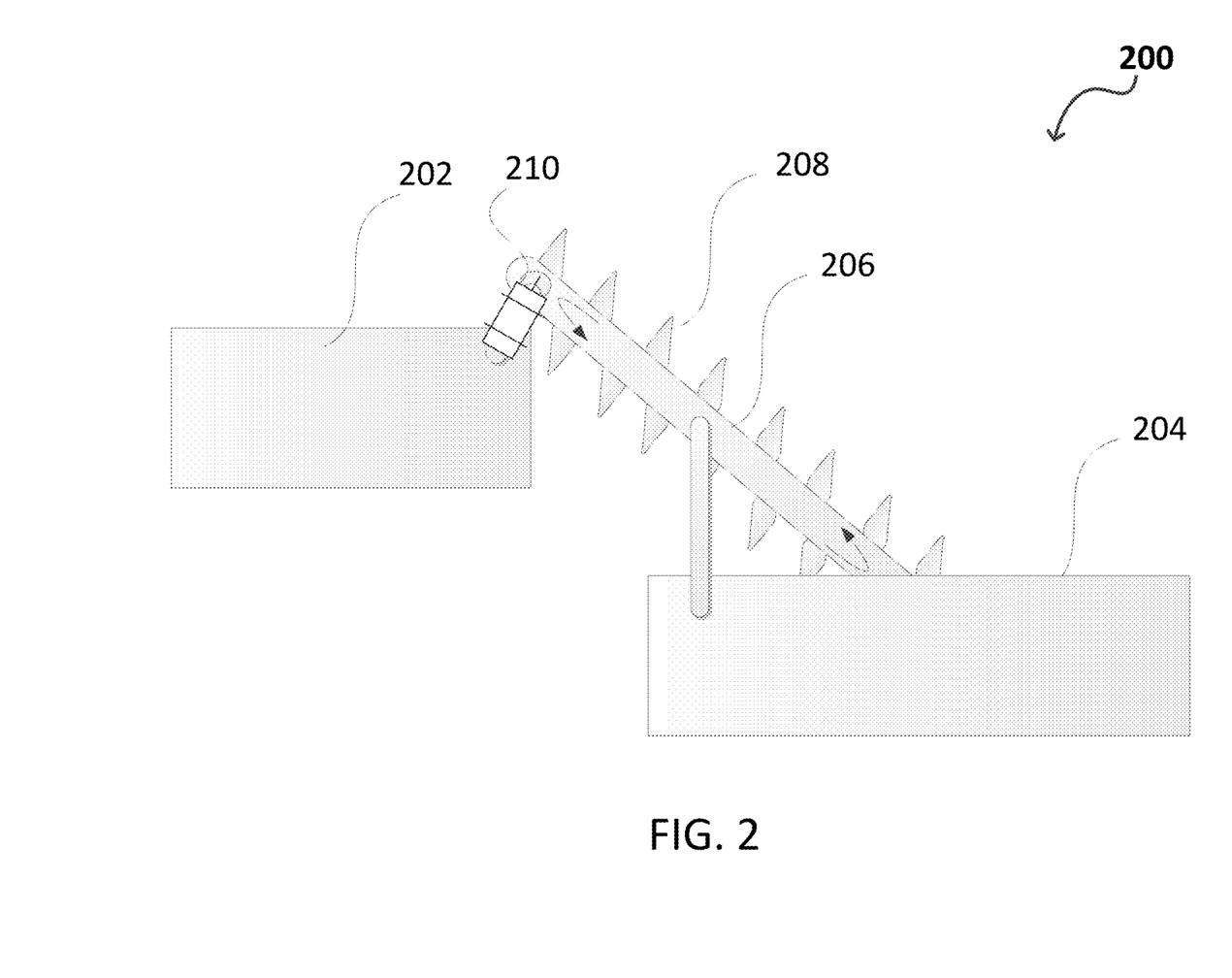
FIG. 2 illustrates a side view of system having a blender tub fed by a conveyer belt-type transportation mechanism that is operated by one or more electric motors in accordance with at least one embodiment herein.

FIG. 2 illustrates a side view of a system 200 having a blender tub 202 fed by a conveyer belt-type transportation mechanism 206 that is operated by one or more electric motors 210 in accordance with at least one embodiment of the present disclosure. In FIG. 2, proppant hopper 204 is provided with proppant for blending with one or more other components in the blender tub 202. In at least one embodiment, proppant hopper 204, blender tub 202, one or more electric motors 210, and a conveyor-belt type transportation mechanism 206 are all part of a mobile unit. In at least one embodiment, a conveyor-belt type transportation mechanism 206 has (as illustrated) a belt with appropriately sized buckets, paddles, or scoops 208, may be operated by at least one electric motor 210 for carrying proppant into a blender tub 202.

In at least one embodiment, a second electric motor may be at a second pulley on a lower part of a transportation mechanism 206 and has associated gears to balance torque requirements to move the transportation mechanism 206. In at least one embodiment, in a similar manner, an electric motor 210 may be also associated with a first pulley and associated gears at a top part of a transportation mechanism 206 to additionally move the transportation mechanism 206. In at least one embodiment, pulleys may be axles, wheels, sheaves, or other readily understood features capable of supporting belt or other transportation mechanisms used in the manner presently described. In at least one embodiment, a belt of a transportation mechanism 206 may be adapted to be within a proppant hopper 204 to enable proper and complete access to proppant therein. Further, the belt may be movable by a further motor or by gravity to be lowered or moved deeper into the proppant hopper 204 as the proppant level decreases within the proppant hopper 204. In at least one embodiment, therefore, at least one transportation mechanism 206 is movable into a proppant hopper 204 to access the blending components.

Figure 3A:
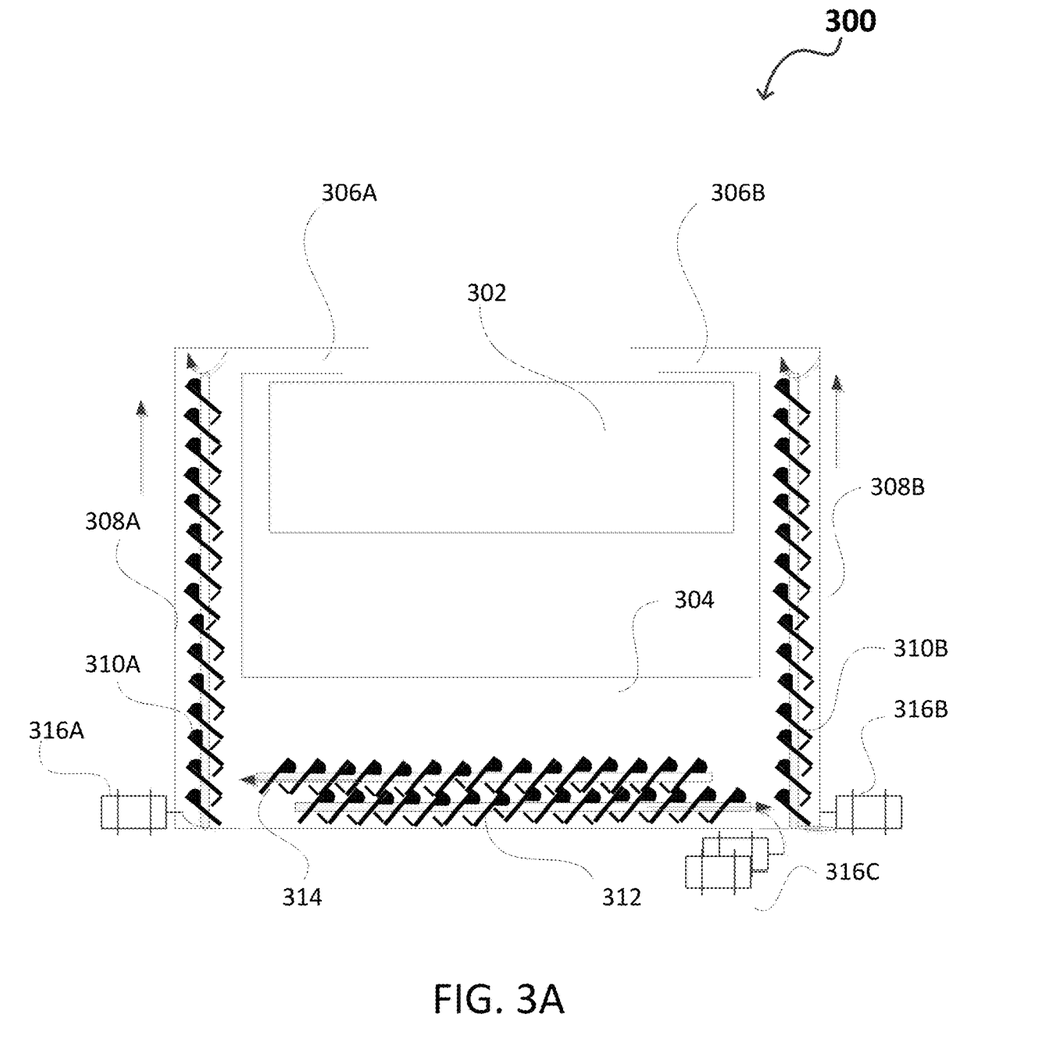
FIGS. 3A, 3B, 3C illustrate a system in various views of one or more augers working in concert by operation of one or more electric motors to feed a blender tub from at least a hopper, in accordance with at least one embodiment herein.
Figure 3B:
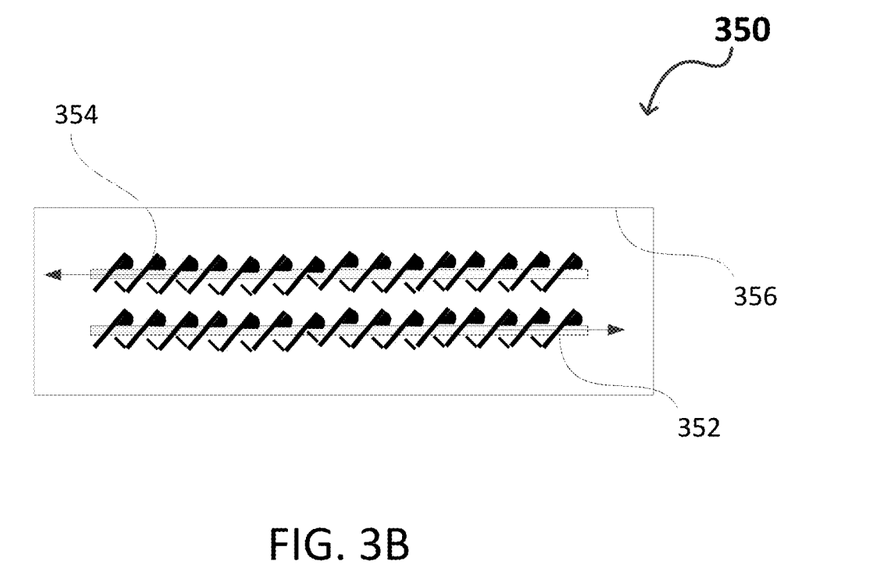
Figure 3C:
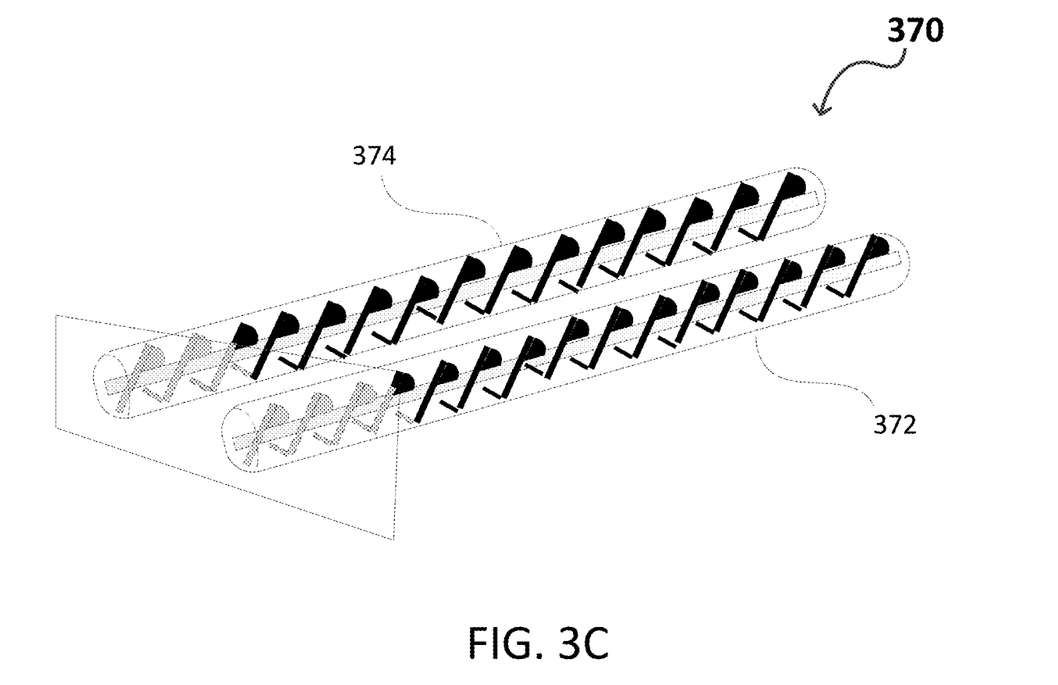

FIGS. 3A, 3B, 3C illustrate a system 300, in various views, of one or more augers 310A, 310B, 312, 314 working in concert by operation of one or more electric motors 316A-C to feed a blender tub 302 from at least a proppant hopper 304 in accordance with at least one embodiment of the present disclosure. In a system 300, base augers 312, 314 (also 352, 354 of plan view 350 in FIG. 3C and 372, 374 of perspective view 370 in FIG. 3C) are located under proppant or at a bottom of a proppant hopper 304. In at least one embodiment, base augers 312, 314 work in concert to funnel or move proppant outwards to side or support augers 310A, B that may be located on each side of a proppant hopper 304. In at least one embodiment, an arrangement, as in FIGS. 3A-3C, allows for access to bearings of provided augers that may need replacement as proppant load may demand over time.

In at least one embodiment, features described above with base and side augers enable provision of two transportation mechanisms, such as two augers. In at least one embodiment, a first one of the two transportation mechanisms are aligned in a first angle with respect to a bottom of the first tub, such as one of side or support augers 310A, 310B. In at least one embodiment, a second one of two transportation mechanisms may be provided in a second angle with respect to a first angle of a first one of the two transportation mechanisms, such as one of base augers 312, 314 being perpendicular to side or support augers 310A, 310B provided in example system 300.

In at least one embodiment, vertical sections 308A, B may be provided as part of a proppant hopper 304 or may be separate chutes that host side augers 310A, B and that support funneling of proppant to a blender tub 302. Delivery areas 306A, B may be part of vertical sections 308A, B provided or may be part of a proppant hopper 304 and may be adapted to deliver proppant to appropriate areas in a blender tub 302. In at least one embodiment, delivery areas 306A, B provided are optional, and instead, vertical sections 308A, B provided may be adapted to enter a blender tub 302 so that proppant may be pushed into a blender tub 302 from any appropriate direction.

In at least one embodiment, a provided section 308A; B may not be vertical but may be angled in any manner to support augers 310A, B, to move proppant with specific control from electric motors 316A, B provided. In at least one embodiment, electric motors 316A, B, C that are provided may be controlled in a synchronous manner so that proppant is continuously moving and does not accumulate in any areas within a proppant hopper 304, within a vertical section 308A, B or within provided delivery areas 306A, B. In at least one embodiment, control to electric motors 316A-C may be from a control section (such as control section 104) of a mobile unit hosting a fracturing fluid blender with electric motors and at least one VFD component.

In at least one embodiment, a control section 104 includes a control unit and is remotely located from an electric motor (and an associated VFD) but is able to provide input to control the at least one VFD, which in turn outputs control signals to an electric motor 316A; B; and C to control a speed of an associated transportation mechanism. In at least one embodiment, by at least their distinct locations, it is understood that a control section 104, on a mobile unit 116, may be remotely located from an electric motor by can communicate input to a VFD for providing control signals to an electric motor. In at least one embodiment, control signals include power are an appropriate voltage, current, and frequency to cause a determined frequency or speed of movement of an associated transportation mechanism. In at least one embodiment, in a manner described with respect to at least FIG. 2, electric motors 316A-C may be associated with respective gears to cause torque within one or more transportation mechanism 310A, B, 312, 314.

FIGS. 4A, 4B, 4C, 4D, and 4E illustrate a system 400; 450; 470; 480; 490 in various views with further detail of one or more augers 404; 454 working in concert, by operation of one or more electric motors 406; 456, to feed a blender tub 408; 458 from at least a hopper 402; 452, in accordance with at least one embodiment. In at least one embodiment, each of a system 400; 450; 470; 480; 490 illustrated may be used interchangeably or in a combination to achieve VFD associated-control with an electric motor and a control unit that supports real-time control of a speed associated with the at least one transportation mechanism. Proppant may be placed in a proppant hopper 402; 452 from an external source or may be already present in a proppant hopper 402; 452. In at least one embodiment, a mobile unit hosting system 400; 450, may be brought on site with a loaded proppant hopper 402; 452. In at least one embodiment, blending operations may be performed on-site. In at least one embodiment, one or more augers 404; 454 are referenced, but are understood in the illustration to be within shielding or angled sections to limit external influence on the proppant or to limit external influence by proppant during movement caused by one or more augers. In at least one embodiment, the augers may be exposed in a semi-covered section.

Figure 4A:
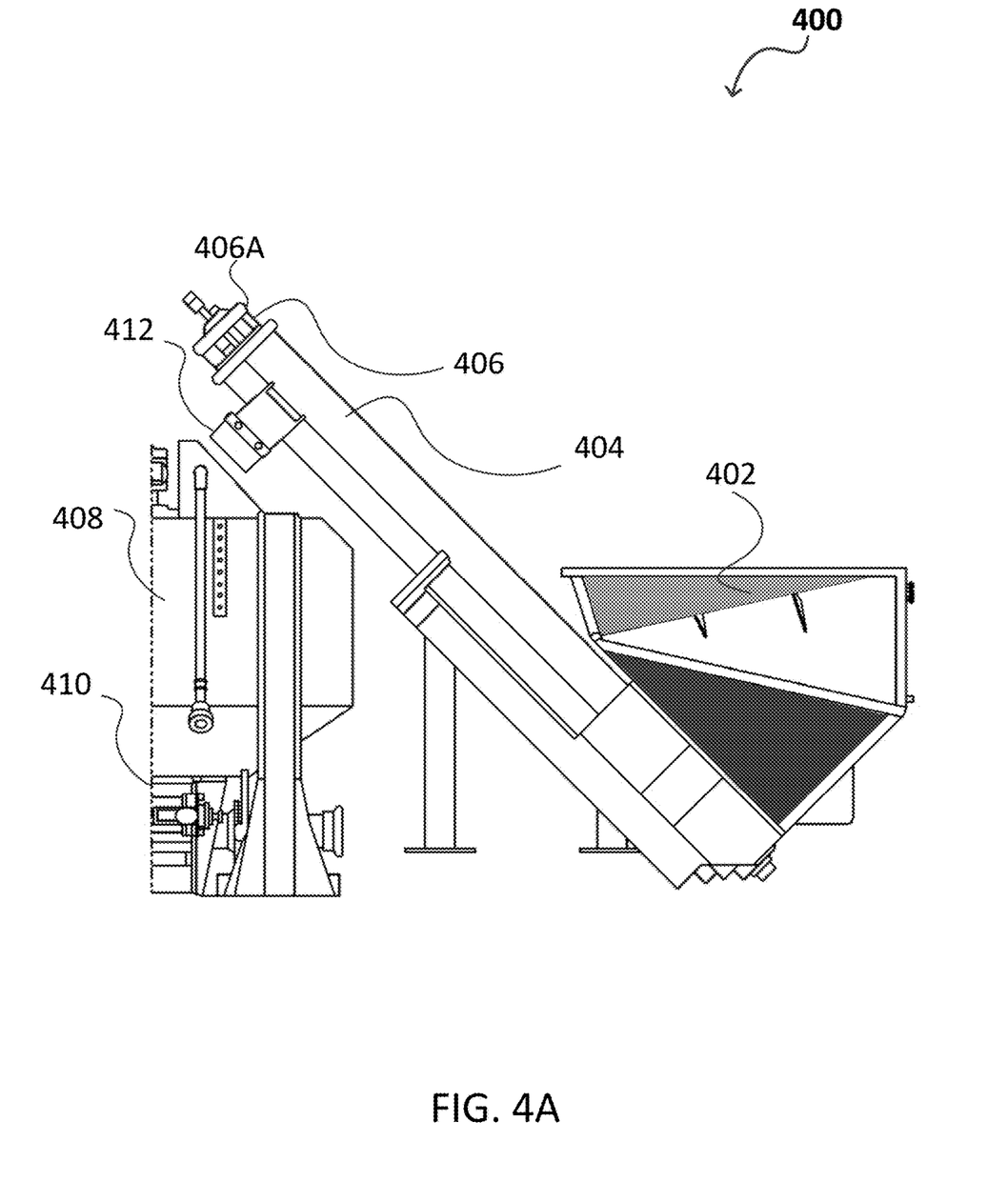
FIGS. 4A, 4B, 4C, 4D, and 4E illustrate a system in various views with further detail of one or more augers working in concert by operation of one or more electric motors to feed a blender tub from at least a hopper, in accordance with at least one embodiment herein.
Figure 4B:
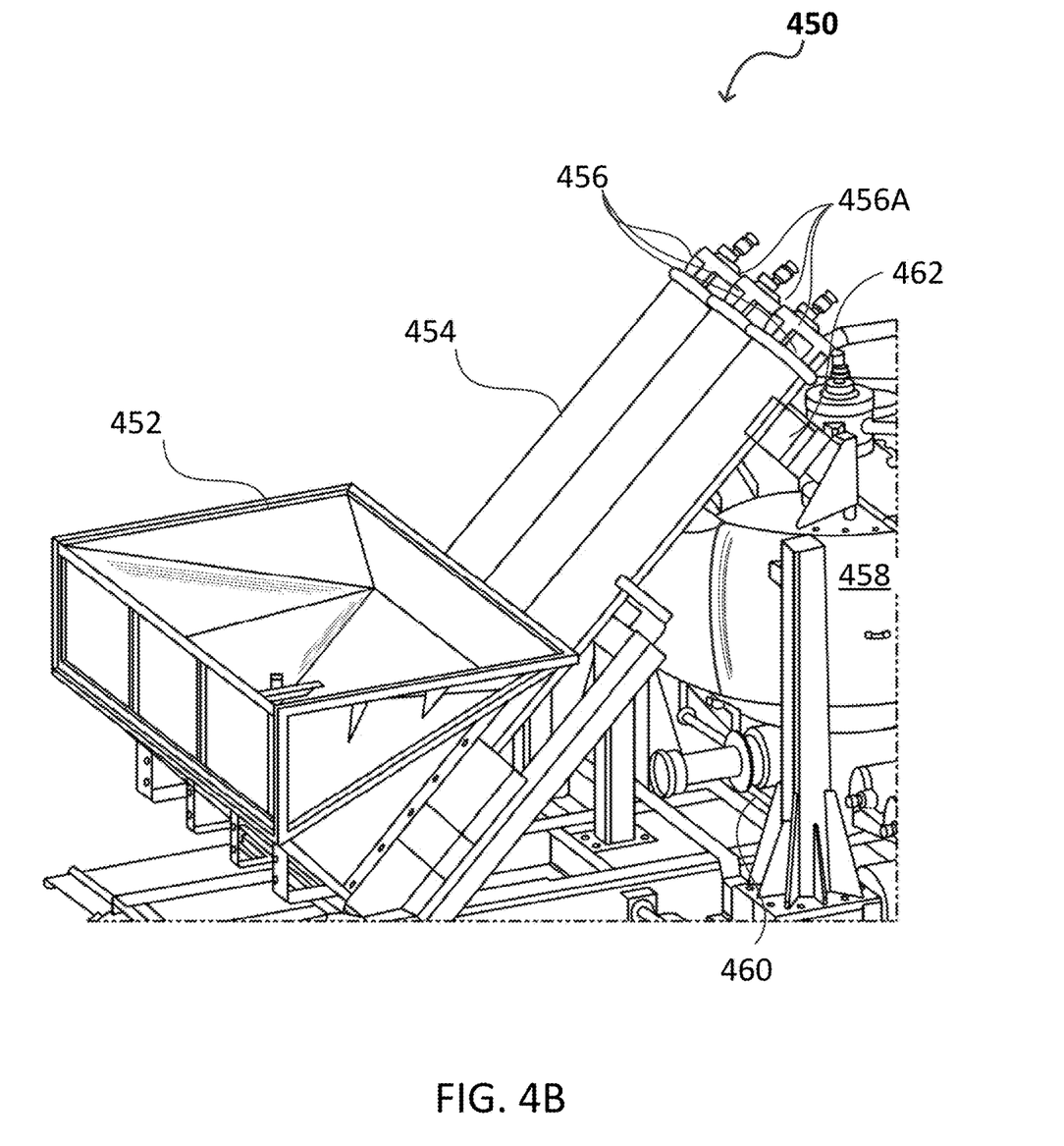

In at least one embodiment, a system 400; 450 removes any risk from hydraulic fluid-related issues, such as possibility of spills that may occur should a hydraulic-based transportation mechanism be used. Further, provided electric motors 406; 456 may also support specific or precise movements so that delivery of proppant according to predetermined concentrations may be more accurately achieved and so that wastage of components to be used for blender fluid may be reduced. In at least one embodiment, automation of a proppant hopper 402; 452 and of one or more augers 404; 454 may be enabled by use of electric motors and associated VFD to further reduce risk and issues associated with hydraulic-based systems. In at least one embodiment, one or more sensors may be used to detect levels of proppant in a proppant hopper 402; 452; to detect an auger speed of one or more augers 404; 454; and to detect a proppant size. From this information, in at least one embodiment, speed of a transportation mechanism may be controlled to avoid overfilling and underfilling of a blender tub, and to avoid damage to a transportation mechanism, for instance.

In at least one embodiment, system 400; 450 therefore describe at least one transportation mechanism 404; 454 and deliver channel 412; 462 to transport blending components from a first tub 402; 452 to a second tub 408; 458, where the second tub is provided to enable blending operations. In at least one embodiment, blending operations occur in a fracturing fluid blender 410; 460 that includes a second tub 408; 458 and associated blending equipment, such as a blending motor. In at least one embodiment, a fracturing fluid blender includes blending motors and other assembly to mix together proppant and other fracturing components to be blended. In at least one embodiment, an electric motor 406; 456 and a control unit 104 (FIG. 1) may be associated with at least one transportation mechanism 404; 454. In at least one embodiment, at least one variable frequency drive (VFD) may be associated with the electric motor and the control unit, and the at least one VFD may be adapted to enable real-time control of a speed associated with at least one transportation mechanism.

In at least one embodiment, a control unit 104 (in FIG. 1) may send an instruction to a VFD 406A; 456A that may be incorporated within a shell of an electric motor 406; 456 or that may be separate from an electric motor 406; 456. In at least one embodiment, a VFD 406A; 456A may be understood to change a speed of an electric motor 406; 456 by varying a frequency of a power applied to the electric motor. In at least one embodiment, a 60 Hz frequency represents 60 cycles per second of applied power to poles of a motor component. In at least one embodiment, a frequency changes a rotations per minute (RPM) of a motor component. In at least one embodiment, 60 Hz may correspond to 3600 RPM but a size of a motor component, a number of poles, and other factors may determine its actual RPM.

In at least one embodiment, a control unit 104 can provide power to a VFD 406A; 456A, along with input to enable a speed (in RPM) or a frequency of operation of a VFD. In at least one embodiment, applied power to a VFD is converted to DC power using rectifiers or converters. In at least one embodiment, smoothed DC power, by filtering capacitors, may be provided to transistors functioning as an inverter that may constantly switch the smoothed DC power to a Pulse Width Modulated (PWM) output. In at least one embodiment, the PMW output is according to a determined frequency or speed for a motor. In at least one embodiment, PWM output includes a proper voltage and associated current to control a 3-phase motor represented by motor components of electric motors 406; 456.

Figure 4C:
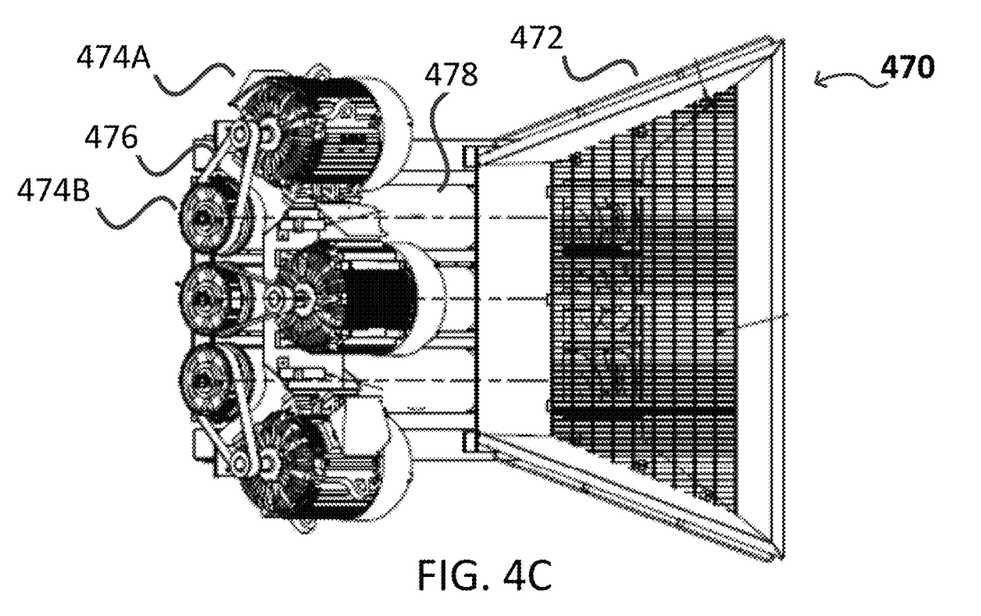

In at least one embodiment, FIG. 4C illustrates a top view of a system 470 (such as a top view of system 400; 450 of FIGS. 4A, 4B) for VFD associated-control with an electric motor and a control unit that supports real-time control of a speed associated with the at least one transportation mechanism. In at least one embodiment, a proppant hopper 472 has associated at least one transportation mechanism 478 that may be a series of enclosed augers. In at least one embodiment, a series of enclosed augers 478 is provided to transport blending components from a proppant hopper 472, which may be a first tub, to a second tub located remotely from the first tub. In at least one embodiment, a second tub receiving proppant from a proppant hopper 472 may use the proppant to enable blending operations.

In at least one embodiment, at least one electric motor 474A may be provided with an associated control unit and with at least one transportation mechanism. In at least one embodiment, at least one VFD may be associated with the electric motor and the control unit. In at least one embodiment, at least one VFD is within a casing of at least one electric motor 474A. In at least one embodiment, a series of three electric motors having respective VFDs or a singular VFD may be provided to operate three transportation mechanism. In at least one embodiment, each electric motor may be coupled to a transportation mechanism via one or more of: a direct drive coupling, a belt driven coupling with augers, or a gear driven coupling. As such, in at least one embodiment, at least one transportation mechanism is associated with or includes a direct drive coupling, a belt driven coupling with augers, or a gear driven coupling.

In at least one embodiment, FIG. 4C illustrates a belt driven coupling between a pulley 474B and a drive shaft or governor of an electric motor 474A. In at least one embodiment, a pulley 474B is attached to an auger causing movement of a transportation mechanism to move proppant. In at least one embodiment, when a drive shaft or governor is enabled to directly move an auger then direct coupling is enabled. In at least one embodiment, when gears, instead of a belt 476, is used between a drive shaft or governor, and a pulley of an auger, then gear driven coupling is enabled. In at least one embodiment, at least one VFD of an electric motor 474A enables real-time control of a speed associated with the at least one transportation mechanism 478.

Figure 4D:
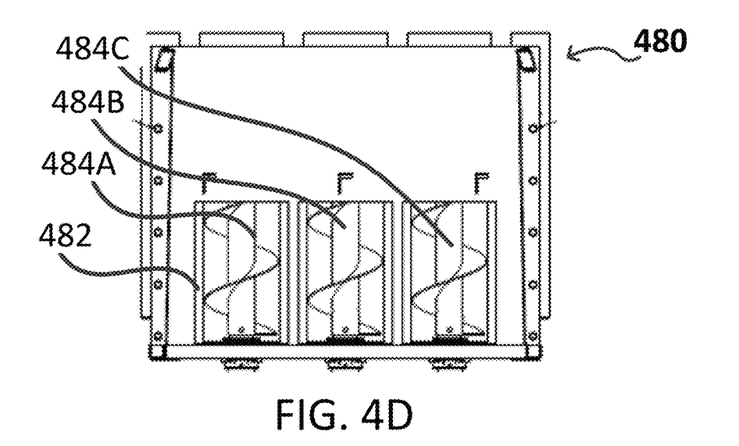

In at least one embodiment, FIG. 4D illustrates a top view of an auger section 480, such as of augers 454 in FIG. 4B. In at least one embodiment, an auger section 480 has three augers 484A-C, each within its own or a shared casing 482. In at least one embodiment, each auger 484A, 484B, 484C, is operated by an electric motor 474A and associated VFD. In at least one embodiment, VFDs and electric motors are controlled via input from a control unit, as discussed in reference to FIGS. 1-4B.

Figure 4E:
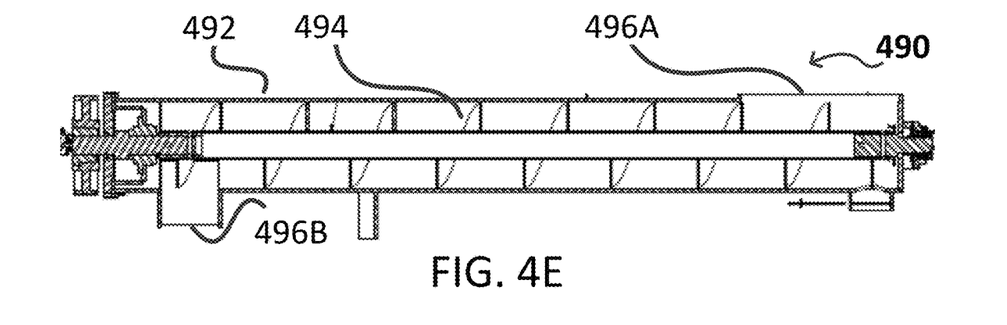

In at least one embodiment, FIG. 4E illustrates a system 490 of an auger 494 within a casing 492 for moving proppant via intake 496A and outlet 496B. In at least one embodiment, a pulley or a gear (or set of pulleys or set of gears) may be associated with one end of an auger 494. In at least one embodiment, at least one auger 494 is operated by an electric motor associated with a pulley, a gear, or directly with a shaft of the at least one auger 494. In at least one embodiment, an intake 496A portion of an auger or its casing may be placed within or associated with a proppant hopper, and an outlet 496B portion of an auger or its casing may be placed within or associated with a blender tub.

Figure 5:
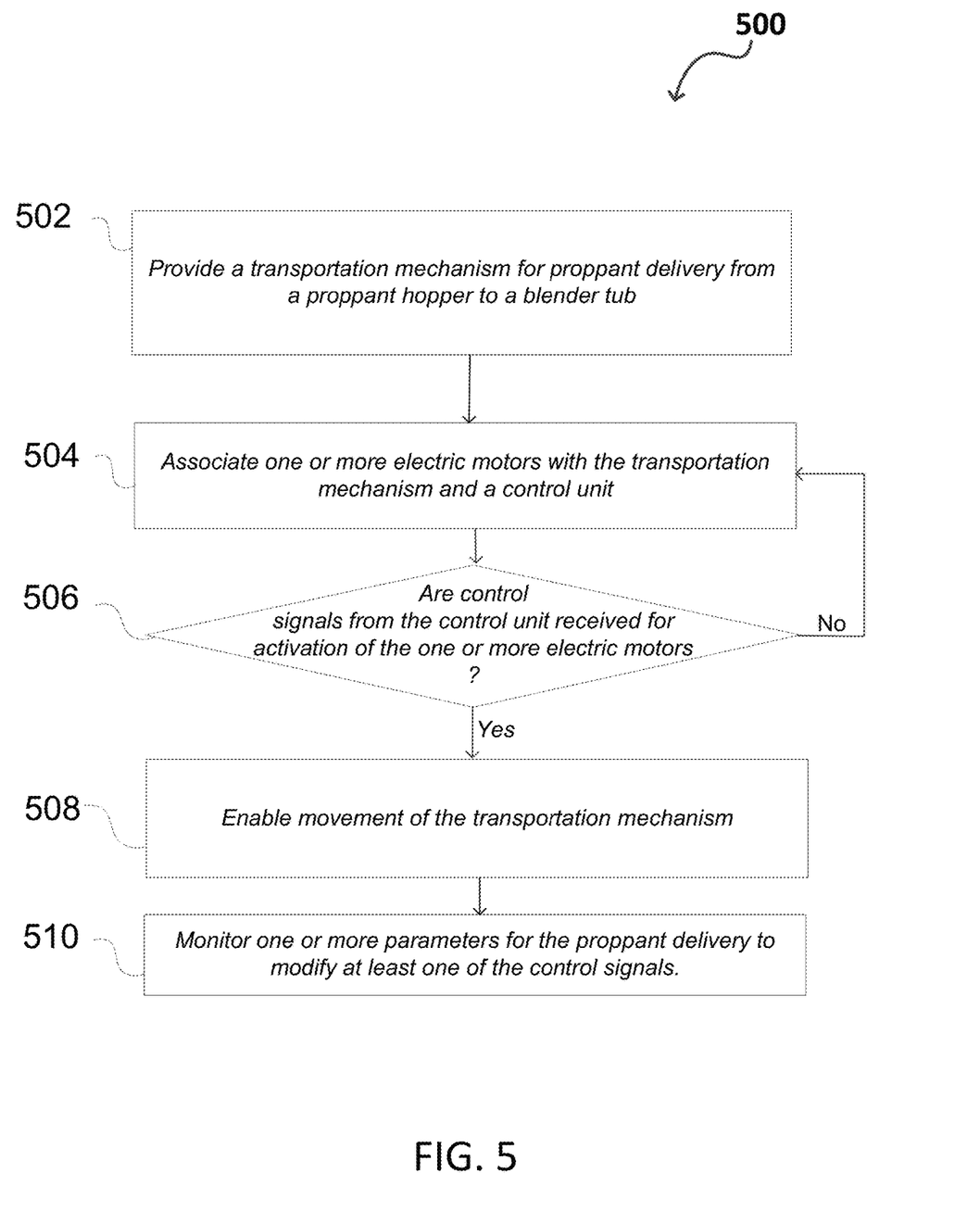
FIG. 5 illustrates a method for manufacture and/or use of an electric-motor driven transportation mechanism in blending for fracturing applications, in accordance with at least one embodiment herein.

FIG. 5 illustrates a method 500 for manufacture and/or for use of an electric-motor driven transportation mechanism in fracturing blender applications in accordance with at least one embodiment of the present disclosure. In at least one embodiment, a method 500 includes providing a system for electric-motor driven transportation mechanism in a fracturing blender. In at least one embodiment, a method 500 includes providing a transportation mechanism, as part of sub-process 502 of the system, to transport proppants or components for a blender fluid from a first tub that may be a proppant hopper to a second tub that may be a blender tub of a fracturing blender. In at least one embodiment, sub-process 502 may be performed by associating at least one transportation mechanism with a first tub and a second tub, so that the at least one transportation mechanism is enabled to transport blending components from the first tub to the second tub for enabling blending operations.

In at least one embodiment, sub-process 504 associates one or more electric motors with the transportation mechanism and a control unit. In at least one embodiment, this may be by coupling mechanical aspects of one or more electric motors with mechanical aspects of a transportation mechanism, and by coupling electrical aspects of one or more electric motors with corresponding electrical aspects of a control unit. In at least one embodiment, sub-process 504 may be understood to enable an electric motor and a control unit to cause movement associated with at least one transportation mechanism.

In at least one embodiment, coupling of mechanical aspects of one or more electric motors and of a transportation mechanism includes such enabling features as providing direct drive coupling, belt driven coupling with augers, and gear driven coupling, as required to cause movement associated with at least one transportation mechanism. In at least one embodiment, direct drive coupling refers to a motor having its shaft coupled to a transportation mechanism, such as via its shaft coupled to a pulley moving augers or moving a conveyor belt. In at least one embodiment, belt driver coupling may be an indirect coupling between a shaft and multiple drive pulleys that moves augers with a belt therebetween. In at least one embodiment, gear driven coupling may be enabled by one or more gears that are caused to move by action of an electric motor and thereby cause movement of a shaft associated augers or a conveyor belt having a pulleys.

In at least one embodiment, sub-process 504 may further include associating at least one variable frequency drive (VFD) with an electric motor and a control unit to cause movement associated with the at least one transportation mechanism. In at least one embodiment, one or more VFDs may be provided within or associated with electric motors for real-time control of a speed associated with a transportation mechanism by control signals from the control unit. In at least one embodiment, sub-process 506 determines that control signals from a control unit are received for activation of one or more electric motors. In at least one embodiment, such a determination may be supported by power input received to a VFD, along with any associated signal that may be indicative of a speed or frequency intended for a motor component.

In at least one embodiment, when control signals are received, a movement of the transportation mechanism may be enabled by a VFD power provided to mechanical aspects of one or more electric motors coupled to a transportation mechanism. One or more parameters of proppant delivery may be monitored in sub-process 510. In an aspect, sub-process 510 may receive and process input from one or more sensors used to detect levels of proppant in the hopper 402; 452; to detect an auger speed of one or more augers 404; 454, and a proppant size. From this information, a speed of a transportation mechanism may be controlled to avoid overfilling and underfilling of a blender tub and to avoid damage to a transportation mechanism, in at least one embodiment. As such, in at least one embodiment, control signals previously provided may be modified from a control unit, via sub-process 510. In at least one embodiment, this sub-process 510 may represent a feature that uses at least one VFD enabled to provide real-time control of a speed associated with movement caused in at least one transportation mechanism. In at least one embodiment, a VFD provides voltage, current, and frequency modulated power to a motor component. In at least one embodiment, a combination of voltage, current, and frequency enable real-time control of a speed associated with movement caused in at least one transportation mechanism.

Various embodiments can be implemented in a wide variety of operating environments and a control unit for the transportation mechanism or the system can include one or more user computers, computing devices, or processing devices which can be used to operate any of a number of applications. User or client devices for a control section or control unit described throughout herein can include any of a number of personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. In at least one embodiment, user or client devices include man-machine interfaces to communicate control from a control unit to a VFD for an electric motor.

Various aspects also can be implemented as part of at least one service or Web service, such as may be part of a service-oriented architecture for external communication of the results, for example. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Some embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

A client environment may be developed in the mobile unit (and pertinently in a control section including a control unit for a VFD) to include a variety of databases and other memory and storage media as discussed above. These can alternatively reside in a variety of locations, such as on a storage medium local to (and/or resident in) one or more of the computers or remote from any or all of the computers across the network. In aspects of the present disclosure, information from the present system may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above.

For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments. Additionally, if a particular decision or action is described as being made or performed "based on" a condition or piece of information, this should not be interpreted as that decision or action being made or performed exclusively based on that condition or piece of information, unless explicitly so stated.

The specification and drawings are, accordingly, to be regarded in an illustrative rather than a restrictive sense. It will, however, be evident that various modifications and changes may be made thereunto without departing from the broader spirit and scope of the invention as set described herein.

What is claimed is:

1. A system comprising:
    at least one transportation mechanism to transport blending components from a first tub to a second tub, the second tub to enable blending operations and to be located within the first tub, wherein the blending components are enabled to be moved to side areas of the first tub via the at least one transportation mechanism, and wherein the transport of the blending components to the second tub occurs through chutes that are provided between the first tub and the second tub in said side areas and that comprises the at least one transportation mechanism;
    an electric motor and a control unit associated with the at least one transportation mechanism; and
    at least one variable frequency drive (VFD) associated with the electric motor and the control unit, the at least one VFD to enable real-time control of a frequency or speed associated with the at least one transportation mechanism.

2. The system of claim 1, wherein the at least one transportation mechanism is associated with or comprises a direct drive coupling, a belt driven coupling with augers, or a gear driven coupling.

3. The system of claim 1, further comprising:
    the at least one VFD located on a mobile unit, along with the electric motor, and adapted to be controlled by the control unit.

4. The system of claim 1, further comprising:
    two transportation mechanisms, a first one of the two transportation mechanisms aligned in a first angle with respect to a bottom of the first tub and a second one of the two transportation mechanisms in a second angle with respect to the first angle of the first one of the two transportation mechanisms.

5. The system of claim 1, further comprising:
    a conveyer belt system or an auger system to function as part of the at least one transportation mechanism, the conveyer belt system or the auger system comprising buckets, paddles, or scoops to transport the blending components.

6. The system of claim 1, further comprising:
    at least one vehicle or trailer of a fracturing fleet comprising one or more of the first tub or the second tub, and comprising the electric motor, the control unit, and the at least one VFD to support the blending operations performed on the at least one vehicle or trailer.

7. The system of claim 1, further comprising:
    the at least one transportation mechanism to be movable into the first tub to access the blending components.

8. The system of claim 1, further comprising:
    the at least one transportation mechanism comprising at least one base transportation mechanism to displace the blending components towards side transportation mechanisms of the at least one transportation mechanism, the side transportation mechanisms to move the blending components from the first tub to the second tub via said chutes.

9. The system of claim 1, further comprising:
    the electric motor to function in a synchronous operation with one or more second electric motors, the electric motor and the one or more second electric motors associated with multiple transportation mechanisms, so that the blending components are continuously moving and are devoid of accumulation in any areas within at least the first tub.

10. The system of claim 1, further comprising:
    the control unit remotely located on a mobile unit to control the VFD for the electric motor.

11. A method comprising:
    associating at least one transportation mechanism with a first tub and a second tub, the second tub located within the first tub, wherein blending components are enabled to be moved to side areas of the first tub via the at least one transportation mechanism and wherein transport of blending components by the at least one transportation mechanism occurs through chutes that are provided between the first tub and the second tub in said side areas;
    associating at least one variable frequency drive (VFD) with an electric motor and a control unit to cause movement associated with the at least one transportation mechanism; and
    enabling the at least one VFD to provide real-time control of a frequency or speed associated with the movement caused in the at least one transportation mechanism.

12. The method of claim 11, wherein the at least one transportation mechanism is associated with or comprises a direct drive coupling, a belt driven coupling with augers, or a gear driven coupling.

13. The method of claim 11, further comprising:
    locating the at least one VFD on a mobile unit, along with the electric motor; and
    adapting the at least one VFD to be controlled by the control unit.

14. The method of claim 11, further comprising:
    providing two transportation mechanisms, a first one of the two transportation mechanisms aligned in a first angle with respect to a bottom of the first tub and a second one of the two transportation mechanisms in a second angle with respect to the first angle of the first one of the two transportation mechanisms.

15. The method of claim 11, further comprising:
enabling a conveyer belt system or an auger system to function as part of the at least one transportation mechanism; and
enabling buckets, paddles, or scoops on the conveyer belt system or the auger system to transport the blending components.

16. The method of claim 11, further comprising:
enabling at least one vehicle or trailer of a fracturing fleet to comprise one or more of the first tub or the second tub, and to comprise the electric motor, the control unit, and the at least one VFD so that the blending operations are performed on the at least one vehicle or trailer.

17. The method of claim 11, further comprising:
enabling movement of the at least one transportation mechanism into the first tub to access the blending components.

18. The method of claim 11, further comprising:
displacing, using at least one base transportation mechanism of the at least one transportation mechanism, the blending components towards side transportation mechanisms of the at least one transportation mechanism comprising; and
moving, using the side transportation mechanisms, the blending components from the first tub to the second tub via said chutes.

19. The method of claim 11, further comprising:
synchronously operating the electric motor with one or more second electric motors, the electric motor and the one or more second electric motors associated with multiple transportation mechanisms, so that the blending components are continuously moving and are devoid of accumulation in any areas within at least the first tub.

20. The method of claim 11, further comprising:
providing a control unit on a mobile unit that is remotely located from the electric motor and that provides control to the VFD for the electric motor.

* * * * *